S. C. MAINE.
Disinfecting Apparatus.
No. 60,212.　　　　　　　　　　　　　　　　　　Patented Dec. 4, 1866.
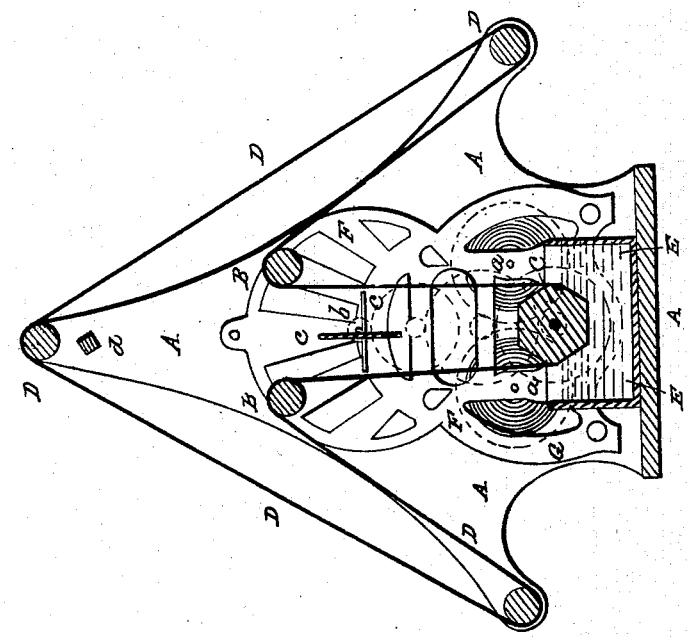
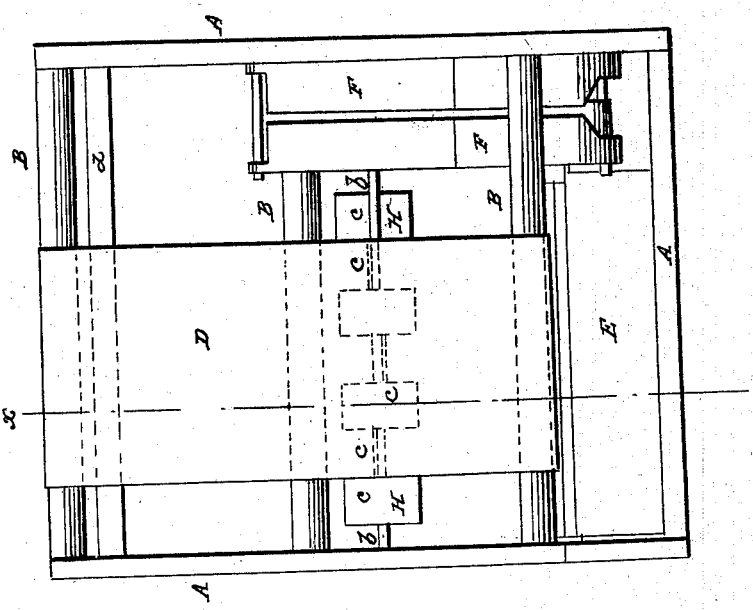
WITNESSES.　　　　　　　　　　　　　　　　　INVENTOR.

United States Patent Office.

IMPROVED APPARATUS FOR COOLING AND DISINFECTING.

SEBEUS C. MAINE, OF BOSTON, MASSACHUSETTS.

Letters Patent No. 60,212, dated December 4, 1866; antedated November 22, 1866.

SPECIFICATION.

TO ALL WHOM IT MAY CONCERN:

Be it known that I, SEBEUS C. MAINE, of Boston, in the county of Suffolk, and State of Massachusetts, have invented certain improvements in Disinfecting and Cooling Apparatus, of which the following is a full, clear, and exact description, reference being had to the accompanying drawings, making part of this specification, in which—

Figure 1 represents a side elevation of my improved apparatus.

Figure 2 is a vertical transverse section through the same on the line $x\ x$ of fig. 1.

My invention consists in the employment of cloth or equivalent porous material, passing into and becoming saturated with any suitable disinfecting and cooling liquid, in connection with a forced current of air, which drives the vapor arising therefrom into the apartment to be purified and cooled.

To enable others skilled in the art to understand and use my invention, I will proceed to describe the manner in which I have carried it out.

In the said drawings, A represents the frame of the apparatus, in suitable bearings, in which are placed a series of rolls, B, around which and a polygonal shaft, C, near the bottom of the apparatus, passes an endless belt, D, of cloth or equivalent porous material. E is a receptacle, which contains ozone, chlorine, or lime water, milk of lime, ice water, or other suitable disinfecting and cooling liquid, through which the belt, D, is carried by the shaft C, which rests within the receptacle E, and is revolved by means of a series of wheels situated in the interior of the casing, F, and driven by springs, G, wound up by keys applied to the winding arbors, $a$. $b$ is a rod or shaft provided with a series of strips, $c$, placed at right angles to each other, and constitutes a fan or blower, H, the shaft $b$ carrying at one end a pinion which gears with and is driven by the clock-work, (which may be placed either within or outside of the casing F.) Instead of the belt D and fan H being driven by clock-work, they may be operated by any other suitable motive power. $d$ is a stay to assist in holding the frame together.

When it is desired to use the disinfecting apparatus above described, it is only necessary to pour the liquid into the receptacle E and wind up the springs G, when the endless belt D is carried under the shaft C, through the liquid, becoming saturated therewith, and thence up over the intermediate rolls, down under the lower rolls and up over the upper roll, passing near the revolving fan or blower H, and forcing a current of air in contact with the travelling belt D, and out of the sides of the apparatus, thereby distributing the vapor arising therefrom into the apartment and purifying or neutralizing the foul or confined air which continues to rush in to supply the place of that blown out already impregnated with the deodorizing liquid. When it is desired to circulate a current of cold air through a heated apartment, a reservoir of ice water charged with a disinfectant may be so connected with the receptacle E as to keep it supplied to the required level at all times.

*Claim.*

What I claim as my invention, and desire to secure by Letters Patent, is—

The employment of cloth or equivalent porous material for receiving and carrying the disinfecting and cooling liquid through or in contact with a current of air produced by a fan, H, or equivalent device, substantially as described.

S. C. MAINE.

Witnesses:
P. E. TESCHEMACHER,
N. W. STEARNS.